(12) United States Patent
Okuyama et al.

(10) Patent No.: US 11,463,745 B2
(45) Date of Patent: Oct. 4, 2022

(54) SYSTEM CONTROL APPARATUS, SYSTEM CONTROL METHOD AND PROGRAM

(71) Applicant: Nippon Telegraph and Telephone Corporation, Tokyo (JP)

(72) Inventors: Takafumi Okuyama, Tokyo (JP); Hiroyuki Kitada, Tokyo (JP); Hiroshi Inoue, Tokyo (JP); Kenichi Endo, Tokyo (JP); Toshiaki Tsuchiya, Tokyo (JP); Seisho Yasukawa, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/292,562

(22) PCT Filed: Nov. 11, 2019

(86) PCT No.: PCT/JP2019/044161
§ 371 (c)(1),
(2) Date: May 10, 2021

(87) PCT Pub. No.: WO2020/100821
PCT Pub. Date: May 22, 2020

(65) Prior Publication Data
US 2022/0007064 A1    Jan. 6, 2022

(30) Foreign Application Priority Data
Nov. 12, 2018  (JP) .............................. JP2018-212495

(51) Int. Cl.
*H04N 21/2343* (2011.01)
*H04N 21/231* (2011.01)
*H04N 21/235* (2011.01)

(52) U.S. Cl.
CPC ....... *H04N 21/2343* (2013.01); *H04N 21/231* (2013.01); *H04N 21/235* (2013.01)

(58) Field of Classification Search
None
See application file for complete search history.

(56) References Cited

U.S. PATENT DOCUMENTS 9,124,947 B2 *  9/2015  Bjordammen ... H04N 21/23418
10,419,786 B1 *  9/2019  Choi ................... H04N 21/6125
(Continued)

FOREIGN PATENT DOCUMENTS

| JP | 2003-331183 | 11/2003 |
| JP | 2008-22298 | 1/2008 |

(Continued)

OTHER PUBLICATIONS

Brisco, "DNS Support for Load Balancing," Network Working Group, RFC 1794, Apr. 1995, 7 pages.
(Continued)

*Primary Examiner* — An Son P Huynh
(74) *Attorney, Agent, or Firm* — Fish & Richardson P.C.

(57) ABSTRACT

A system control device that transmits a manifest file describing information necessary for acquiring video data to a viewing client in a system that performs distribution of the video data via a network includes: generation means for generating the manifest file on the basis of at least one of identification information indicating a viewer attribute, a time zone, and a state of the system according to a prescribed control policy; and transmission means for transmitting the manifest file generated by the generation means to the viewing client.

16 Claims, 9 Drawing Sheets

(56) References Cited

U.S. PATENT DOCUMENTS

| | | | |
|---|---|---|---|
| 10,701,415 B2* | 6/2020 | Lee | H04N 21/643 |
| 2008/0221942 A1 | 9/2008 | Agnihotri et al. | |
| 2012/0047542 A1* | 2/2012 | Lewis | H04N 21/812 |
| | | | 725/97 |
| 2013/0067052 A1* | 3/2013 | Reynolds | H04N 21/2668 |
| | | | 709/223 |
| 2014/0331133 A1* | 11/2014 | Coburn, IV | H04N 21/2541 |
| | | | 715/716 |
| 2014/0379871 A1 | 12/2014 | Van Brandenburg et al. | |
| 2015/0172762 A1 | 6/2015 | Tokumo et al. | |
| 2015/0325268 A1* | 11/2015 | Berger | H04N 21/44204 |
| | | | 386/248 |
| 2015/0373385 A1 | 12/2015 | Straub et al. | |
| 2015/0373423 A1 | 12/2015 | Iwanami et al. | |
| 2016/0294909 A1* | 10/2016 | Killick | H04W 4/21 |
| 2017/0272485 A1* | 9/2017 | Gordon | H04L 65/601 |
| 2018/0176623 A1* | 6/2018 | Nugent | H04N 21/6547 |
| 2018/0302452 A1* | 10/2018 | Pantos | H04L 67/02 |
| 2020/0021892 A1* | 1/2020 | April | H04N 21/6125 |

FOREIGN PATENT DOCUMENTS

| | | |
|---|---|---|
| JP | 2008-529338 | 7/2008 |
| JP | 2015-510161 | 4/2015 |
| JP | 2015-170323 | 9/2015 |
| JP | 2016-509811 | 3/2016 |
| WO | WO 2014010444 | 1/2014 |
| WO | WO 2014112416 | 7/2014 |

OTHER PUBLICATIONS

Labevent.ecl.ntt.co.jp, [online], "High-definition, high-presence video CDN technology: Achieves economically high QoE," Feb. 22, 2018, retrieved from URL<https://labevent.ecl.ntt.co.jp/fbrum2018/infb/index.html>, 5 pages (with English Translation).

Okuyama et al., "High-definition, high-presence CDN technology," NTT Technology Journal, 2018, 30(6):64-67, 9 pages (with English Translation).

* cited by examiner

| VIEWER ATTRIBUTE | IDENTIFICATION INFORMATION |
|---|---|
| LIVING IN TOKYO | A=1 |
| LIVING IN OSAKA | A=2 |
| MAN | B=1 |
| WOMAN | B=2 |

Fig. 6

| TIME ZONE | NETWORK/SYSTEM STATE | IDENTIFICATION INFORMATION | VIDEO DISTRIBUTION SERVER | CONTENTS OF VIDEO | VIDEO QUALITY |
|---|---|---|---|---|---|
| ALL | TOKYO SERVER NORMAL AND OSAKA SERVER NORMAL | A=1&B=1 | TOKYO SERVER | CONTENT WITH CM FOR MEN | HIGH |
| ALL | TOKYO SERVER NORMAL AND OSAKA SERVER NORMAL | A=1&B=2 | TOKYO SERVER | CONTENT WITH CM FOR WOMEN | HIGH |
| ALL | TOKYO SERVER NORMAL AND OSAKA SERVER NORMAL | A=2&B=1 | OSAKA SERVER | CONTENT WITH CM FOR MEN | HIGH |
| ALL | TOKYO SERVER NORMAL AND OSAKA SERVER NORMAL | A=2&B=2 | OSAKA SERVER | CONTENT WITH CM FOR WOMEN | HIGH |
| ALL | TOKYO SERVER NORMAL AND OSAKA SERVER NORMAL | NOTHING | TOKYO SERVER | CONTENT WITH CM FOR PUBLIC | LOW |
| ALL | TOKYO SERVER ABNORMAL AND OSAKA SERVER NORMAL | ARBITRARY | OSAKA SERVER | CONTENT WITH CM FOR PUBLIC | LOW |

SYSTEM CONTROL APPARATUS, SYSTEM CONTROL METHOD AND PROGRAM

CROSS-REFERENCE TO RELATED APPLICATIONS

This application is a National Stage application under 35 U.S.C. § 371 of International Application No. PCT/JP2019/044161, having an International Filing Date of Nov. 11, 2019, which claims priority to Japanese Application Serial No. 2018-212495, filed on Nov. 12, 2018. The disclosure of the prior application is considered part of the disclosure of this application, and is incorporated in its entirety into this application.

TECHNICAL FIELD

The present invention relates to a technology to perform system control for video distribution.

BACKGROUND ART

A content provider (CP) that performs video distribution has need to increase engagement (viewing time) in consideration of the balance between video quality and distribution cost to enhance the competitiveness of service, and attaches importance to control to dynamically constitute optimum contents of video (content or advertisement) in accordance with the attribute of a viewer (viewer attribute), a network/system state, and a time zone and perform distribution with proper image quality from an optimum video distribution server.

Conventionally, a DNS (Domain Name System) (NPL 1) and a direct instruction system for a viewing client have been known as technologies to control video distribution. In the DNS, when a viewing client performs the name resolution of a video distribution server with communication other than a video distribution protocol, the DNS returns the IP address of a selected video distribution server and guides the request of the viewing client to the selected video distribution server. In the direct instruction system for a viewing client, instructions about customized information on contents of video, a video distribution server to be connected, or image quality to be acquired are given to a viewing client with communication other than a video distribution protocol.

CITATION LIST

Non Patent Literature

[NPL 1] RFC 1794 DNS Support for Load Balancing April 1995

SUMMARY OF THE INVENTION

Technical Problem

As described above, the technologies capable of controlling video distribution exist. However, it is necessary to construct, separately from a video distribution protocol, mechanism that performs control or communication means for transmitting and receiving an instruction message for each control purpose (the dynamic configuration for optimum contents of video, the selection of an optimum video distribution server, and the selection of proper image quality). Therefore, for example, excessive cost is incurred, or processing is delayed. That is, the conventional technologies have a problem that efficient control cannot be performed in a video distribution system that employs a video distribution protocol with which a viewing client acquires video data on the basis of a manifest file describing information necessary for reproducing video.

The present invention has been made in view of the above points and has an object of providing a technology that generates and transmits a proper manifest file to enable efficient control in a video distribution system that employs a video distribution protocol with which a viewing client acquires video data on the basis of a manifest file describing information necessary for reproducing video.

Means for Solving the Problem

According to a disclosed technology, there is provided a system control device that transmits a manifest file describing information necessary for acquiring video data to a viewing client in a system that performs distribution of the video data via a network, the system control device including:

Generation means for generating the manifest file on the basis of at least one of identification information indicating a viewer attribute, a time zone, and a state of the system according to a prescribed control policy; and transmission means for transmitting the manifest file generated by the generation means to the viewing client.

Effects of the Invention

According to a disclosed technology, it is possible to efficiently generate and transmit a proper manifest file to enable efficient control in a video distribution system that employs a video distribution protocol with which a viewing client acquires video data on the basis or a manifest file describing information necessary for reproducing video.

BRIEF DESCRIPTION OF DRAWINGS

FIG. 6 is a table showing the rule of a control policy in the first embodiment.

DESCRIPTION OF EMBODIMENTS

Hereinafter, embodiments of the present invention will be described with reference to the drawings. The embodiments that will be described below are given only as an example, and embodiments to which the present invention is applied are not limited to the following embodiments. Hereinafter, a first embodiment and a second embodiment will be described. In the second embodiment, a point different from that of the first embodiment will be mainly described.

First Embodiment (Entire Configuration of System)

Figure 1:
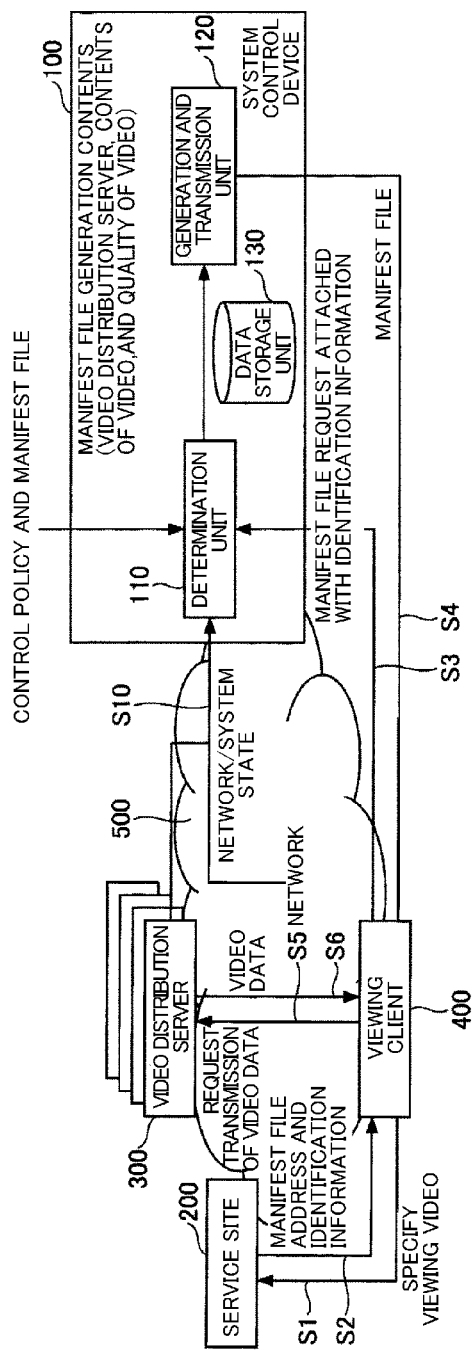
FIG. 1 is a system configuration diagram in an embodiment.

FIG. 1 shows the entire configuration or a video distribution system in the first embodiment. FIG. 1 also shows the flow of the input and output of information between devices. As shown in FIG. 1, the present video distribution system includes a system control device 100, a service site 200, a video distribution server 300, and a viewing client 400, all of which are connected to a network 500. Various information such as a manifest file and video data is transmitted and received via the network 500. The video distribution system is an example of a video distribution system that employs a video distribution protocol with which a viewing client acquires video data on the basis of a manifest file describing information necessary for reproducing video. Note that a distribution mode in the present embodiment assumes on-demand distribution, live distribution, or linear distribution but the present invention is not limited to a specific distribution mode.

The system control device 100 is a device that Generates a manifest file on the basis of a manifest file request from the viewing client 400 and transmits the generated manifest file to the viewing client 400. The details of the system control device 100 will be described later.

The service site 200 is a website (web server) that offers the service of a CP (video content distribution provider) and has a function that enables a user to confirm viewable video content.

The video distribution server 300 accumulates video data (such as a segment file and a chunk) and transmits video data in response to a video data request from the viewing client 400. Further, a plurality of video distribution servers 300 exist on the network 500 (for example, the video distribution servers 300 exist by districts). In the plurality of video distribution servers 300, the same data of video content exists in common, or the data obtained by dividing the video content exists separately, for example.

The viewing client 400 is a terminal such as a PC, a smartphone, and a tablet used by a user in video distribution service.

(Hardware Configuration Example)

The respective devices constituting the video distribution system in the first embodiment (same applies to the second embodiment) are realizable by, for example, causing a computer to perform a program describing a processing content described in the embodiment. Note that the "computer" may be a virtual machine offered by cloud service. When the virtual machine is used, "hardware" described here is virtual hardware.

The devices are realizable by performing a program corresponding to processing implemented by the devices using a hardware resource such as a CPU and a memory included in the computer. The above program is capable of being stored or distributed in a state of being recorded on a computer-readable recording medium (such as a transportable memory). Further, the above program is capable of being offered via a network such as the Internet and an e-mail.

Figures 2, 3:
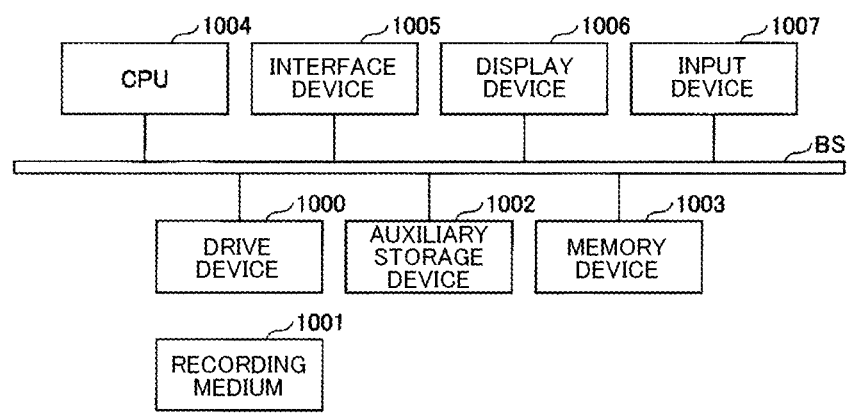
FIG. 2 is a diagram showing a hardware configuration example of an apparatus.
FIG. 3 is a table showing the corresponding relationship between a viewer attribute and identification information in the first embodiment.

FIG. 2 is a diagram showing a hardware configuration example of the above computer in the present embodiment. The computer in FIG. 2 has a drive device 1000, an auxiliary storage device 1002, a memory device 1003, a CPU 1004, an interface device 1005, a display device 1006, an input device 1007, and the like, all of which are connected to each other via a bus B.

A program that realizes processing in the computer is offered by, for example, a recording medium 1001 such as a CD-ROM and a memory card. When the recording medium 1001 storing the program is set in the drive device 1000, the program is installed in the auxiliary storage device 1002 from the recording medium 1001 via the drive device 1000. However, the program is not necessarily installed from the recording medium 1001 but may be downloaded from another computer via a network. The auxiliary storage device 1002 stores a necessary file, data, or the like, besides the installed program.

The memory device 1003 reads the program from the auxiliary storage device 1002 and stores the same when receiving an instruction to start the program. The CPU 1004 realizes functions related to the devices in the video distribution system according to the program stored in the memory device 1003. The interface device 1005 is used as an interface for connection with a network. The display device 1006 displays a GUT (Graphical User Interface) or the like based on the program. The input device 1007 is constituted by a keyboard and a mouse, buttons, a touch panel, or the like and used to input various operation instructions.

(Entire Operation Example of System)

Next, the entire operation of the video distribution system in the first embodiment (same applies to the second embodiment) will be described along step numbers shown in FIG. 1.

In S1, the viewing client 400 specifies video for the service site 200. In S2, the service site 200 returns a manifest file address corresponding to the specified video and identification information on the viewer attribute of the viewing client 400 to the viewing client 400.

The identification information on the viewer attribute includes but not limited to the network address of the viewing client 400, the login state of a website that offers video distribution service, a service membership type, the model of a terminal operated by the viewing client 400, the gender/age/use area of a viewer, or the like.

Further, the identification information may be generated and encoded by a CP using the corresponding relationship between the viewer attribute and the identification information, which is acquired in advance by another means, shown in FIG. 3. In the example of FIG. 3, the viewer attribute of the use area of a viewer is represented by A, and the identification information is represented by A=1 when the viewer lives in Tokyo and represented by A=2 when the viewer lives in Osaka. Similarly, the viewer attribute of the gender of the viewer is represented by B, and the identification information is represented by B=1 when the viewer is a man and represented by B=2 when the viewer is a woman.

In S3 shown in FIG. 1, the viewing client 400 transmits a manifest file request attached with the identification information to the system control device 100, The system control device 100 generates (or selects) a manifest file on the basis of the request and transmits the manifest file to the viewing client 400 in S4. Note that the operation of S4 is not limited to the transmission of the manifest file itself but may include the transmission of an identifier (such as a URL and an address) indicating the place of the manifest file to the viewing client 400 and the request and acquisition of the manifest file by the viewing client 400 on the basis of information on the received identifier.

In S5, the viewing client 400 requests the video distribution server 300 to transmit video data on the basis of the manifest file acquired from the system control device 100, In S6, the video distribution server 300 transmits the requested video data to the viewing client 400, and the viewing client 400 reproduces the video data.

As shown in S10, the video distribution server 300 and the network 500 can grasp the resource states and normality (called a "network/system state") of devices constituting the video distribution server 300 and the network 500 and transmit the same to the system control device 100. The system control device 100 acquires the above resource states and normality at, for example, prescribed time intervals.

(Configuration and Operation of System Control Device)

As shown in FIG. 1, the system control device 100 has a determination unit 110, a generation and transmission unit 120, and a data storage unit 130. Hereinafter, the operations of the respective units shown in FIG. 1 will be described in detail along the procedures of the flowcharts in FIGS. 4 and 5. Note that the configuration (function segmentation) of the system control device 100 shown in FIG. 1 is given only as an example. For example, the function of determining the content of a manifest file and generating the manifest file by "the determination unit 110 and the generation and transmission unit 120" may correspond to a generation unit (generation means), and the function of transmitting the manifest file by "the generation and transmission unit 120" may correspond to a transmission unit (transmission means).

Figure 4:
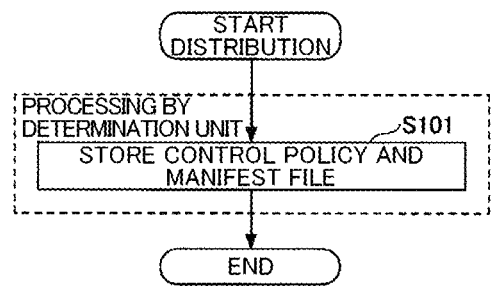
FIG. 4 is a flowchart for describing an operation related to the distribution start of a system control device in the first embodiment.

<S101 in FIG. 4>

In S101 shown in FIG. 4, a control policy and a manifest file for video are input to the determination unit 110 by a CP when the distribution of the certain video is started, and the determination unit 110 stores the control policy and the manifest file in the data storage unit 130. As the input manifest file, a general manifest file output from a commercial encoder or the like is assumed. Note that means for inputting the control policy and the manifest file for the video to the determination unit 110 includes but not limited to a mode such as inputting the control policy and the manifest file for the video from an external system and referring to information stored in the system or the like. Further, in the case of live distribution or linear distribution, the manifest file may be periodically input to the determination unit 110 not only when the distribution of the video is started but also when the distribution of the video is being performed, and the determination unit 110 may store the manifest file in the data storage unit 130.

Figure 5:
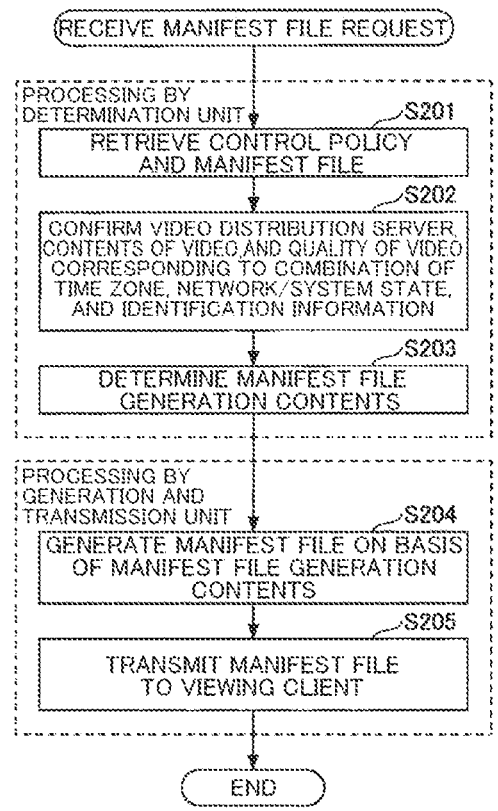
FIG. 5 is a flowchart for describing an operation related to the reception of a manifest file request by the system control device in the first embodiment.

<S201, S201, and S203 in FIG. 5>

When receiving a manifest file request attached with identification information from the viewing client 400, the determination unit 110 retrieves a control policy and a manifest file stored in the data storage unit 130 in S201 (S201) and confirms a video distribution server, contents of video, and quality of video corresponding to a combination of a time zone, a network/system state, and identification information (S202). In a case in which the identification information is encoded, the determination unit 110 decodes the identification information to be confirmed. Further, the time zone is, for example, a time zone to which the reception time of the manifest file belongs. Then, the determination unit 110 determines the video distribution server, the contents of video, and the quality of video corresponding to the combination of the time zone, the network/system state, and the identification information as a video distribution server, contents of video, and quality of video that are manifest file Generation contents. In addition, the determination unit 110 determines the retrieved manifest file as manifest file generation contents (S203).

Note that the use of a combination of a time zone, a network/system state, and identification information is an example. For example, at least one of the three information of a time zone, a network/system state, and identification information may be used to determine a video distribution server, contents of video, and quality of video. Note that the use of at least one of the three information of a time zone, a network/system state, and identification information includes a case in which a combination of any of the time zone, the network/system state, and the identification information and information different from any of the time zone, the network/system state, and the identification information is used. Further, a video distribution server, contents of video, and quality of video are an example of information necessary for acquiring video data. Further, when it is assumed that a network is also included in a system as for "a network/system state", the "network/system state" may be rephrased as the state of the system.

For example, one or any two of a time zone, a network/system state, and identification information may be used to retrieve a control policy and a manifest file, and obtained information may be determined as manifest file generation contents.

A control policy stored in the data storage unit 130 may be a ruled table or the template of a processing procedure (logic) determined in advance along the control policy. The template of the processing procedure (logic) is a program and called to be performed.

FIG. 6 shows an example of a table in which a control policy is made into a rule. The table shown in FIG. 6 stores a video distribution server, contents of video, and quality of video corresponding to a network/system state and identification information (viewer attribute) for each time zone.

For example, when a network/system state is "Tokyo server normal and Osaka server normal" and identification information attached to a received manifest file request is "A=1 and B=1" (living in Tokyo and a man), the determination unit 110 determines a video distribution server=a Tokyo server, contents of video=content with a CM for men, and video quality=high as manifest file generation contents from the table shown in FIG. 6. Note that FIG. 6 is only an example. As a table in which a control policy is made into a rule, a table having one or any two of a time zone, a system state, and identification information and information necessary for acquiring video data may be used.

Figure 7:
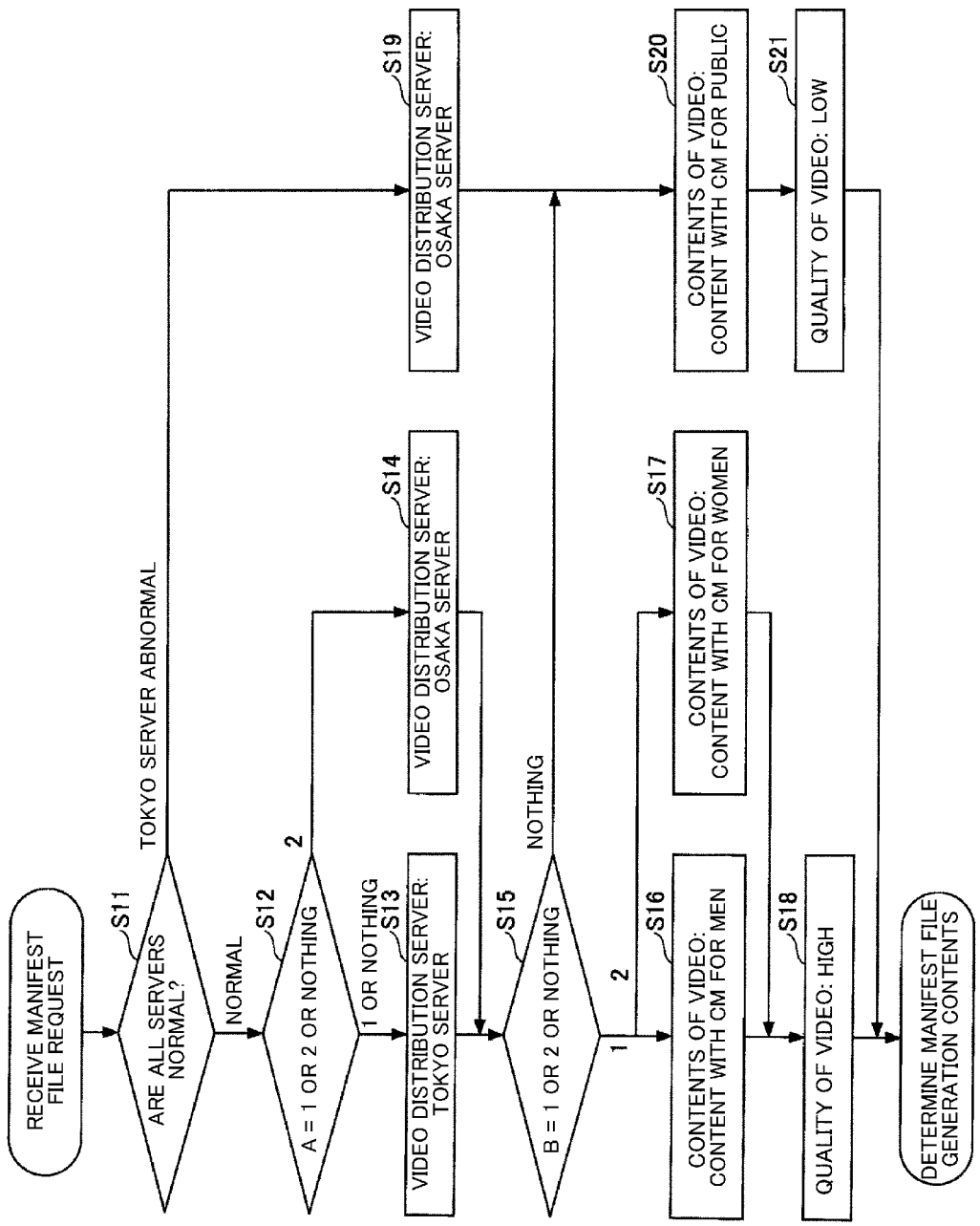
FIG. 7 is a flowchart showing an example of the processing procedure of the system control device in the first embodiment.

FIG. 7 shows a flowchart corresponding to the template of a processing procedure. The application of the template is made possible when the template is customized after calling. An example shown in FIG. 7 is an example in which specific values are used as the variables of the template. The processing of the determination unit 110 along the flowchart will be described.

When receiving a manifest file request, the determination unit 110 first determines whether all servers are normal (S11). When all the servers are normal, the determination unit 110 determines the value of A in S12. The processing proceeds to S13 when A is 1 or nothing, or proceeds to S14 when A is 2.

The determination unit 110 determines a Tokyo server as a video distribution server in S13. Otherwise, the determination unit 110 determines an Osaka server as a video distribution server in S14.

In 315, the determination unit 110 determines the value of B. The processing proceeds to S16 when B is 1, proceeds to S17 when B is 2, or proceeds to S20 when B is nothing. The determination unit 110 determines content with a CM for men as contents of video in S16. Alternatively, the determination unit 110 determines content with a CM for women as contents of video in S17. Alternatively, the determination unit 110 determines content with a CM for the public as contents of video in S20.

The determination unit 110 determines a high level as quality of video in S18 following S16 or S17. Alternatively, the determination unit 110 determines a low level as quality of video in S21 following S20.

For example, when the Tokyo server is abnormal in S11, the processing proceeds to S19 and the determination unit 110 determines the Osaka server as a video distribution server. In addition, the determination unit 110 determines content with a CM for the public as contents of video in S20. In addition, the determination unit 110 determines a low level as quality of video in S21.

The example of the processing procedure shown in FIG. 7 provides a processing procedure for determining manifest file generation contents so that the viewing client 400 acquires video data having low video quality from another normal video distribution server with respect to a system fallback in a case in which a certain video distribution server is out of order.

<S204 and S205 in FIG. 5>

The generation and transmission unit 120 generates a manifest file on the basis of the manifest file generation contents determined by the determination unit 110 (S204). In addition, the generation and transmission unit 120 transmits the generated manifest file to the viewing client 400 (S205). Note that in S205, the generation and transmission unit 120 may transmit an identifier (such as a URL and an address) indicating the place of the manifest file to the viewing client 400 instead of transmitting the manifest file itself. Thus, the viewing client 400 may request the transmission of the manifest file on the basis of information on the received identifier and acquire the same. The generation of a manifest file is to make contents determined in S203 into a file under a format stipulated by a prescribed video distribution protocol.

Note that in a case in which a generated manifest file is stored in the data storage unit 130, the manifest file may be read from the data storage unit 130 to be used when it is necessary to generate the manifest file on the basis of the same contents afterward.

Second Embodiment

Next, a second embodiment will be described. The system configuration and the flow of the entire processing of the second embodiment are the same as those of the first embodiment and described above with reference to FIG. 1. In the second embodiment, the processing of the determination unit 110 and the generation and transmission unit 120 in the system control device 100 is different from that of the first embodiment.

In the first embodiment, the retrieval of a control policy and a manifest file and manifest file generation processing are performed every time a manifest file request is received. On the other hand, in the second embodiment, one or more manifest files are generated in advance as candidates for a manifest file to be transmitted, and the manifest file to be transmitted is selected from among the one or more manifest files when a request is received. Therefore, in the second embodiment, a calculation processing amount can be reduced compared with the first embodiment in which a manifest file is generated for each request.

Hereinafter, the operation of the system control device 100 in the second embodiment will be described in detail along the procedures of the flowcharts in FIGS. 8 and 9.

Figure 8:
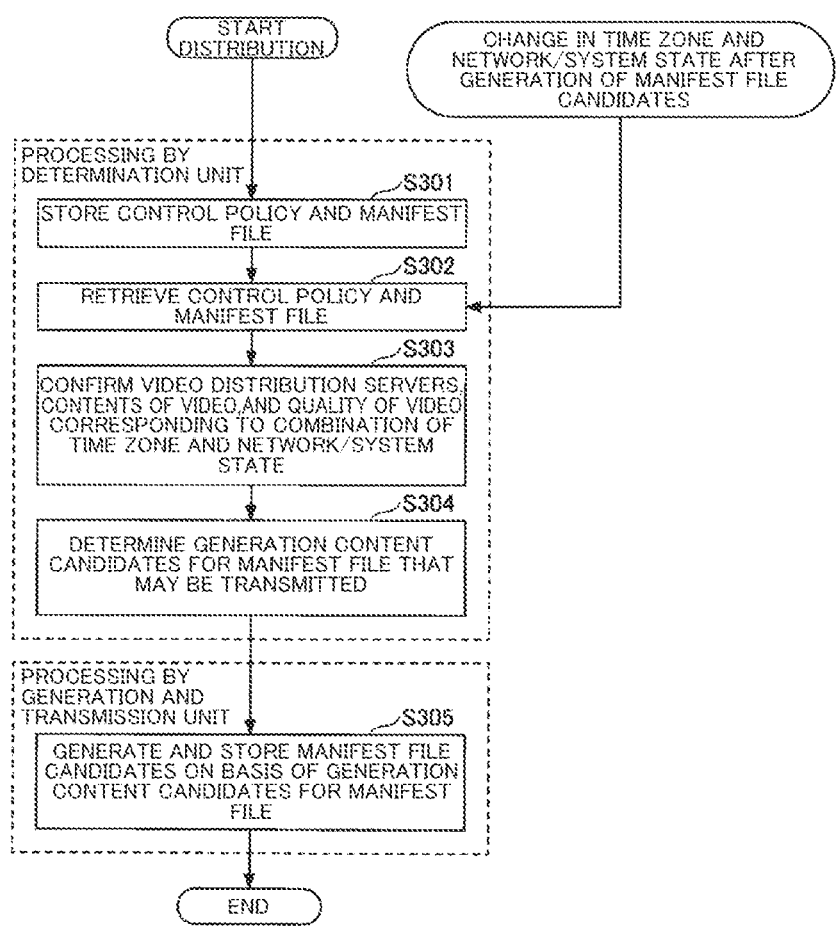
FIG. 8 is a flowchart for describing operations related to distribution start and a state change after the generation of a manifest file of the system control device according to a second embodiment.

<S301 in FIG. 8>

In S301, a control policy and a manifest file for video are input to the determination unit 110 by a CP when the distribution of the certain video is started, and then are stored in the data storage unit 130. As the input manifest file, a general manifest file output from a commercial encoder or the like is assumed. The control policy and the manifest file and input means for inputting the control policy and the manifest file are same as those of the first embodiment.

<S302, S303, and S304 in FIG. 8>

In S302, the determination unit 110 retrieves the control policy and the manifest file stored in the data storage unit 130 (S302), confirms (extracts) video distribution servers, contents of video, and quality of video corresponding to a combination of a current time zone and a current network/system state without the specification of the condition of identification information (S303), and determines the obtained one or more "video distribution servers, contents of video, and quality or video" and the retrieved manifest file as generation content candidates for the manifest file that may be transmitted (S303).

<S305 in FIG. 8>

In S305, the generation and transmission unit 120 generates one or more manifest files as candidates on the basis of the generation content candidates for the manifest file that are determined by the determination unit 110 and stores the same in the data storage unit 130. Note that in a case in which a distribution mode is live distribution or linear distribution, it is assumed that manifest files are generated in advance and then periodic update processing for realizing the distribution mode is additionally performed. However, the present invention is not limited to this.

<At Time of State Change>

As shown in FIG. 8, when detecting a change in a time zone or a network/system state (or both the time zone and the network/system state) after the generation of candidates for a manifest file, the determination unit 110 refers to a control policy and the manifest file again, confirms the time zone and the network/system state, and extracts video distribution servers, contents of video, and quality of video corresponding to a combination of a current time zone and a current network/system state to determine generation content candidates for the manifest file again (S302 to S304).

Further, when the generation content candidates for the manifest file are determined again, the transmission and generation unit 120 generates one or more manifest file candidates again and stores the same in the data storage unit 130.

Figure 9:
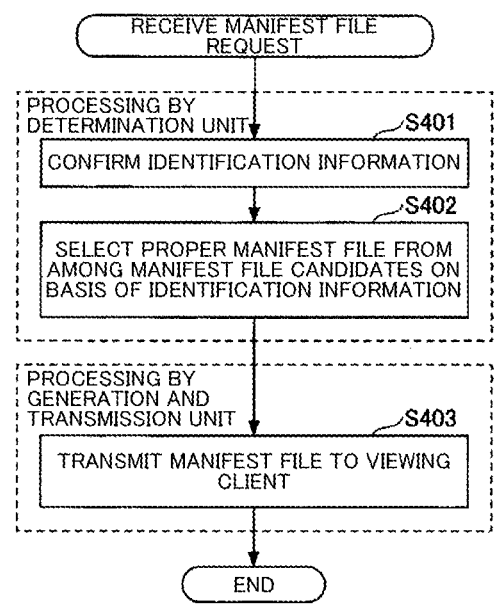
FIG. 9 is a flowchart for describing an operation related to the reception of a manifest file request by the system control device according to the second embodiment.

<S401, S402, and S403 in FIG. 9>

Next, an operation performed when a request is received will be described along the procedure of the flowchart in FIG. 9. When receiving a manifest file request attached with identification information from the viewing client 400, the determination unit 110 confirms the identification information (S401) and selects a proper manifest file from among manifest files stored in the data storage unit 130 on the basis of the identification information (S402). In a case in which the identification information is encoded, the determination unit 110 decodes the identification information to be used. The generation and transmission unit 120 transmits the manifest file selected by the determination unit 110 to the viewing client 400 (S403). Note that in S403, the Generation and transmission unit 120 may transmit an identifier (such as a URL and an address) indicating the place of the manifest file to the viewing client 400 instead of transmitting the manifest file itself, and the viewing client 400 may request the transmission of the manifest file on the basis of the received identifier and acquire the same.

Figure 10:
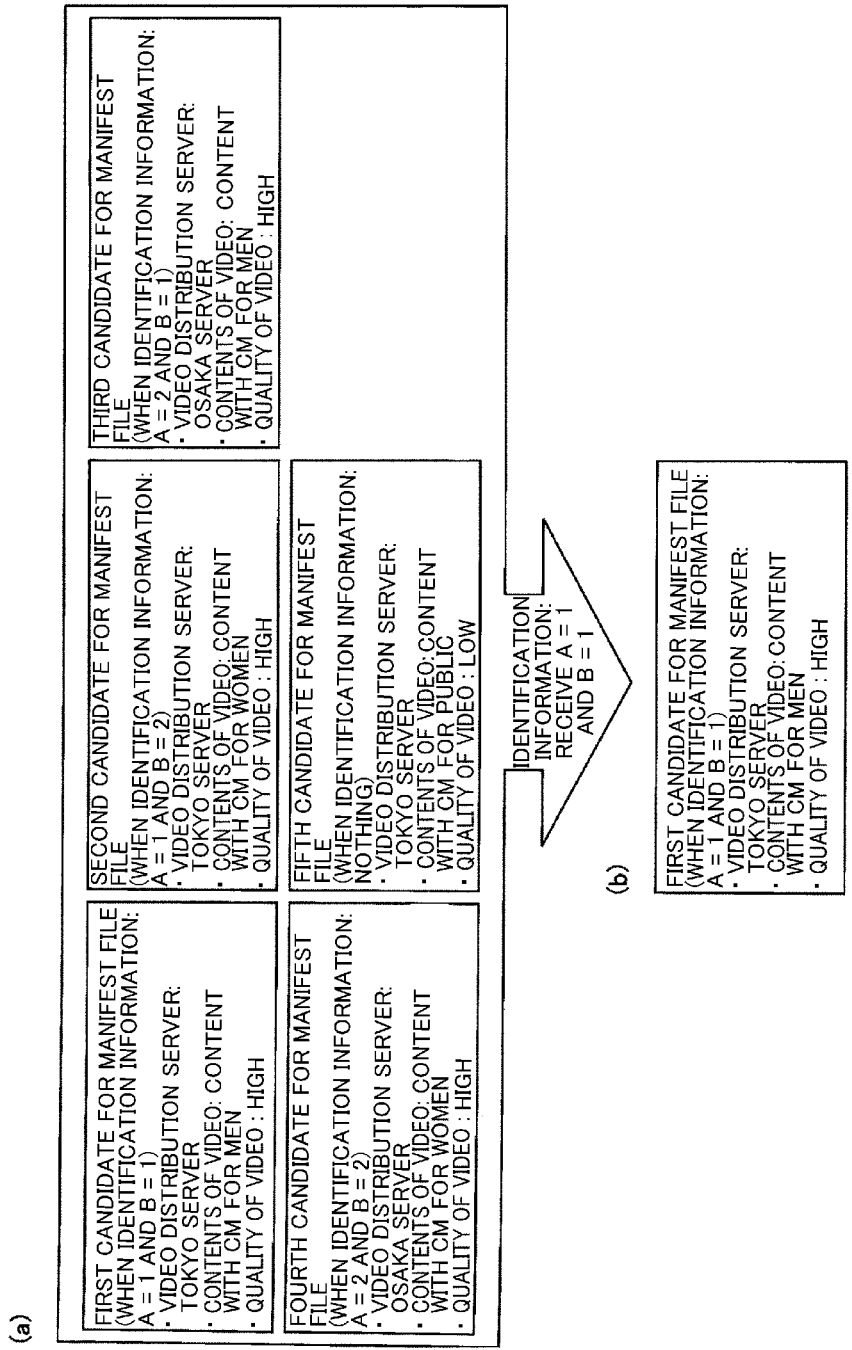
FIG. 10 is a diagram for describing the generation and selection of candidates for a manifest file by the system control device in the second embodiment.

A selective operation in S402 will be described in further detail. For example, information shown in FIG. 10(a) is stored in the data storage unit 130 as information on candidates for a manifest file.

In S402, the determination unit 110 retrieves the candidates for the manifest file using the received identification information as a key. For example, when the identification information is A=1 and B=1, a first candidate for the manifest file corresponding to the identification information A=1 and B=1 is selected from among the first to fifth candidates for the manifest file as shown in FIG. 10(b).

Summary of Embodiments, Effects, Etc

As described above, the embodiments of the present invention include the system control device 100. The system control device 100 determines manifest file generation contents on the basis of a control policy and a manifest file, generates a manifest file on the basis of the manifest file generation contents, and transmits the generated manifest file to the viewing client.

Thus, in a video distribution system that employs a Video distribution protocol with which a viewing client acquires video data on the basis of a manifest file describing information necessary for reproducing video, a control mechanism or communication other than the video distribution protocol can be eliminated. As a result, efficient control is made possible by the generation and transmission of a proper manifest file. Further, a manifest file requested by a viewing client can be dynamically generated according to a control policy and a manifest file input by a CP. As a result, the flexible control of video distribution is made possible.

The present specification discloses at least the following items.

(Item 1)

A system control device that transmits a manifest file describing information necessary for acquiring video data to a viewing client in a system that performs distribution of the video data via a network, the system control device including the following means.

The system control device includes generation means for generating the manifest file on the basis of at least one of identification information indicating a viewer attribute, a time zone, and a state or the system according to a prescribed control policy.

In addition, the system control device includes transmission means for transmitting the manifest file generated by the generation means to the viewing client.

Note that a function unit including the determination unit 110 and the generation and transmission unit 120 described in the embodiments is an example of the generation means, and the generation and transmission unit 120 is an example of the transmission means.

(Item 2)

The system control device according to item 1, wherein, when receiving the identification information indicating the viewer attribute together with a manifest file request from the viewing client, the generation means generates the manifest file on the basis of the identification information, the time zone, and the state of the system or both the time zone and the state of the system.

(Item 3)

In the system control device according to item 1, the generation means is characterized as follows. The system control device generates one or more manifest files in advance as candidates for the manifest file to be transmitted. In addition, the system control device selects the manifest file corresponding to the identification information from among the one or more manifest files when receiving the identification information indicating the viewer attribute together with a manifest file request from the viewing client.

(Item 4)

The system control device according to item 3, wherein, when the time zone or the state of the system is changed, the generation means generates one or more manifest files again as the candidates.

(Item 5)

The system control device according to any one of items 1 to 4, wherein the prescribed control policy is stored in a data storage unit as a table that contains at least one of the identification information indicating the viewer attribute, the time zone, and the state of the system and the information necessary for acquiring the video data.

(Item 6)

The system control device according to any one of items 1 to 4, wherein the prescribed control policy is stored in a data storage unit as a processing procedure for determining a content of the manifest file.

(Item 7)

A system control method performed by a system control device that transmits a manifest file describing information necessary for acquiring video data to a viewing client in a system that performs distribution of the video data via a network, the system control method including the following characteristics. The characteristics include a generation step of generating the manifest file on the basis of at least one of identification information indicating a viewer attribute, a time zone, and a state of the system according to a prescribed control policy. In addition, the characteristics include a transmission step of transmitting the manifest file generated in the generation step to the viewing client.

(Item 8)

A program for causing a computer to function as the respective means in the system control device according to any one of items 1 to 6.

The present embodiments are described above. The present invention is not limited to such specific embodiments but may be deformed and modified in various ways without departing from the spirit of the present invention described in claims.

REFERENCE SIGNS LIST

100 System control device
110 Determination unit
120 Generation and transmission unit
130 Data storage unit 200 Service site
300 Video distribution server
400 Viewing client
500 Network
1000 Drive device
1001 Recording medium
1002 Auxiliary storage device
1003 Memory device
1004 CPU
1005 Interface device
1006 Display device
1007 Input device

The invention claimed is:

1. A system control device that transmits a manifest file describing information necessary for acquiring video data to a viewing client in a system that performs distribution of the video data via a network, the system control device comprising:
   a generation unit, including one or more processors, configured to generate the manifest file on a basis of at least one of identification information indicating a viewer attribute, a time zone, and a state of the system according to a prescribed control policy, wherein the generation unit is configured to:
      obtain identification information indicating the viewer attribute, the time zone, and the state of the system;
      generate one or more manifest files in advance as candidates for the manifest file using the identification information;
      determine a change to at least one of the time zone and the state of the system;
      in response to determining the change to at least one of the time zone and the state of the system, generating one or more additional manifest files as the candidates based on the change to at least one of the time zone and the state of the system, before receiving a manifest file request;
      receive a manifest file request and the indication information; and
      select the manifest file corresponding to the identification information from among the candidates; and
   a transmission unit, including one or more processors, configured to transmit the selected manifest file generated by the generation unit to the viewing client.

2. The system control device according to claim 1, wherein, when receiving the identification information indicating the viewer attribute together with the manifest file request from the viewing client, the generation unit is configured to generate the manifest file on a basis of the identification information, the time zone, and the state of the system or both the time zone and the state of the system.

3. The system control device according to claim 1, wherein the prescribed control policy is stored in a data storage unit as a table that contains at least one of the identification information indicating the viewer attribute, the time zone, and the state of the system and the information necessary for acquiring the video data.

4. The system control device according to claim 1, wherein the prescribed control policy is stored in a data storage unit as a processing procedure for determining a content of the manifest file.

5. The system control device according to claim 1, wherein the system control device further comprises:
   a determination unit, including one or more processors, configured to receive the selected manifest file on a periodic basic in response to (i) an initiation of a distribution of the video data to the viewing client and (ii) during an execution of the distribution of the video data to the viewing client.

6. The system control device according to claim 5, wherein the determination unit is configured to (i) retrieve a control policy and a manifest file, (ii) confirm a video distribution server, (iii) confirm contents of video, and (iv) quality of video to be distributed corresponding to the identification information, in response to receiving the manifest file request and the identification information.

7. A system control method performed by a system control device that transmits a manifest file describing information necessary for acquiring video data to a viewing client in a system that performs distribution of the video data via a network, the system control method comprising:
   generating the manifest file on a basis of at least one of identification information indicating a viewer attribute, a time zone, and a state of the system according to a prescribed control policy, wherein generating the manifest file further comprises:
      obtaining identification information indicating the viewer attribute, the time zone, and the state of the system;
      generating one or more manifest files in advance as candidates for the manifest file using the identification information;
      determining a change to at least one of the time zone and the state of the system;
      in response to determining the change to at least one of the time zone and the state of the system, generating one or more additional manifest files as the candidates based on the change to the at least one of the time zone and the state of the system, before receiving a manifest file request;
      receiving the manifest file request and the indication information; and
      selecting the manifest file corresponding to the identification information from among the candidates; and
   transmitting the selected manifest to the viewing client.

8. The system control method according to claim 7, further comprising: generating the manifest file on a basis of the identification information, the time zone, and the state of the system or both the time zone and the state of the system when receiving the identification information indicating the viewer attribute together with the manifest file request from the viewing client.

9. The system control method of claim 7, further comprising: storing the prescribed control policy in a data storage unit as a table that contains at least one of the identification information indicating the viewer attribute, the time zone, and the state of the system and the information necessary for acquiring the video data.

10. The system control method of claim 7, further comprising: storing the prescribed control policy in a data storage unit as a processing procedure for determining a content of the manifest file.

11. The system control method according to claim 7, further comprising: providing the manifest file to a determination unit during a distribution of the video data.

12. The system control method according to claim 7, further comprising: providing the manifest file to a determination unit during a start of a distribution of the video data.

13. A non-transitory computer readable medium storing one or more instructions causing a computer to execute:

transmitting a manifest file describing information necessary for acquiring video data to a viewing client in a system that performs distribution of the video data via a network;
generating the manifest file on a basis of at least one of identification information indicating a viewer attribute, a time zone, and a state of the system according to a prescribed control policy, wherein generating the manifest file further comprises:
  obtaining identification information indicating the viewer attribute, the time zone, and the state of the system;
  generating one or more manifest files in advance as candidates for the manifest file using the identification information;
  determining a change to at least one of the time zone and the state of the system;
  in response to determining the change to at least one of the time zone and the state of the system, generating one or more additional manifest files as the candidates based on the change to the at least one of the time zone and the state of the system, before receiving a manifest file request;
  receiving the manifest file request and the indication information; and
  selecting the manifest file corresponding to the identification information from among the candidates; and
  transmitting the manifest file to the viewing client.

14. The non-transitory computer readable medium according to claim 13, wherein the one or more instructions further cause the computer to execute: generating the manifest file on a basis of the identification information, the time zone, and the state of the system of both the time zone and the state of the system when receiving the identification information indicating the viewer attribute together with the manifest file request from the viewing client.

15. The non-transitory computer readable medium according to claim 13, wherein the one or more instructions further cause the computer to execute: storing the prescribed control policy in a data storage unit as a table that contains at least one of the identification information indicating the viewer attribute, the time zone, and the state of the system and the information necessary for acquiring the video data.

16. The non-transitory computer readable medium according to claim 13, wherein the one or more instructions further cause the computer to execute: storing the prescribed control policy in a data storage unit as a processing procedure for determining a content of the manifest file.

* * * * *